March 28, 1944. G. E. ARMINGTON ET AL Re. 22,459

PIPE COUPLING

Original Filed Dec. 21, 1940

INVENTOR
GEORGE E. ARMINGTON
RAYMOND Q. ARMINGTON
BY
Hyde and Meyer
ATTORNEYS

Reissued Mar. 28, 1944

Re. 22,459

UNITED STATES PATENT OFFICE 22,459

PIPE COUPLING

George E. Armington, South Euclid, and Raymond Q. Armington, Shaker Heights, Ohio, assignors to The Euclid Road Machinery Company, Euclid, Ohio, a corporation of Ohio Original No. 2,318,575, dated May 11, 1943, Serial No. 371,193, December 21, 1940. Application for reissue December 2, 1943, Serial No. 512,658

5 Claims. (Cl. 285—165)

This invention relates to improvements in pipe couplings adapted to withstand heavy pressure.

An object of the present invention is to provide a pipe coupling utilizing a compressible washer or gasket which is more tightly compressed to seal the joint the greater the pressure becomes. Furthermore our improved invention requires very few parts and is easy to manufacture and assemble.

Other objects and advantages of the invention will appear from the accompanying drawing and descriptions and the essential features thereof will be set forth in the claims.

Figure 1:
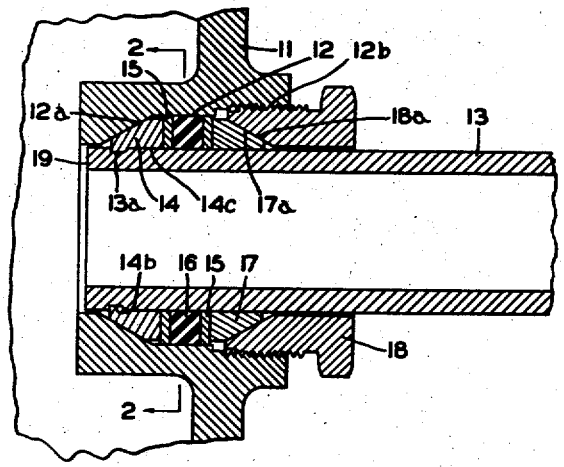
Figure 2:
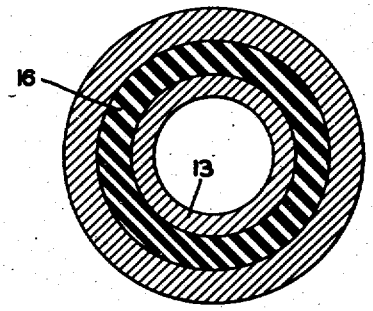

In the drawing, Fig. 1 is a central longitudinal sectional view through our improved coupling; Fig. 2 is a sectional view taken along the line 2—2 of Fig. 1; while Figs. 3 and 4 are plan views of two of the rings shown in Fig. 1.

Referring first to Fig. 1, a housing or other structure to which the pipe is to be coupled is indicated at 11 having formed therein, in suitable bosses or otherwise, a recess 12 having at its inner end a frustoconical surface 12a diverging outwardly and a threaded portion 12b at the outer end of the recess. The pipe 13 which is to be connected to the housing in a leakproof manner is provided with an annular groove at 13a. A lock ring 14, shown in plan in Fig. 3, has a frustoconical surface 14a complementary to the surface 12a on the housing. The ring is also provided with an annular inwardly extending projection 14b adapted to fit into the groove or recess 13a in the pipe. The two last mentioned features are complementary. It is necessary that the inner portion of ring 14 enter into recess 13a, and the outer portion of ring 14 has such a surface at the point 14a that surface 12a on the housing will press ring 14 into recess 13a when nut 18 is tightened. The diameter of the ring at the point 14c is adapted to slide on the outside diameter of pipe 13. At 15 are indicated flat annular metal washers between which is an annular washer or gasket 16 of rubber or other compressible material adapted to fit fairly closely between the pipe 13 and the recess 12 in the housing. A wedge ring 17 has an internal diameter adapted to slide on pipe 13 and is provided with a frustoconical surface 17a converging outwardly or toward the right as viewed in Fig. 1 and complementary to a similar surface 18a on a packing nut 18 which engages the threads 12b of the housing recess.

Figure 3:
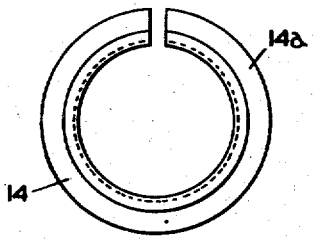
Figure 4:
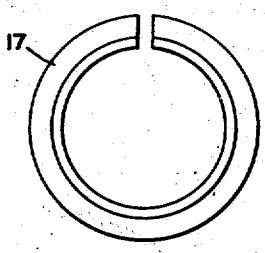

In the use of our invention the parts are slipped on the pipe 13 in the order shown in Fig. 1, the lock ring 14 being the last member in position and adapted to be snapped in groove 13a because of the split ring construction shown in Fig. 3. The parts are then placed in position in the housing 11 as shown in Fig. 1 and the packing nut 18 engaged with the threads 12b. The wedge ring 17 squeezes the gasket 16 against the lock ring 14 causing a very tight engagement between the gasket and pipe 13 on one hand and between the gasket and the recess 12 of the housing 11 on the other hand. The efficiency of this joint is so great that using a 1" pipe as indicated at 13, the packing nut 18 when tightened by hand will provide a joint adapted to withstand a pressure of 1,000 pounds per square inch without leakage.

By the use of our improved pipe coupling connections may be cheaply made by the use of few parts of simple design. If a leak occurs at any joint it is only necessary to tighten up on the packing nut 18 to stop leakage and if a new gasket is necessary a single joint may be disassembled without disconnecting the other joints along the pipe as is the case where the customary unions or pipe couplings are used.

There is sufficient clearance between the metal parts of our improved coupling so that there is no difficulty about the alinement of the joint.

It will be noted upon an inspection of Fig. 1, that fluid pressure in the system exerts an unbalanced effect upon the exposed end of pipe 13 at the point 19. Obviously when this pressure is extremely high there is a tendency to move pipe 13 toward the right as viewed in Fig. 1 and because of the tight engagement between the pipe and the lock ring 14 this pressure is exerted against the sealing gasket 16 so as to increase the sealing effect.

What we claim is:

1. In a pipe coupling, inner and outer telescoping tubular members, a deformation in the outer wall of said inner member where it lies within the outer member, a lock ring lying between said members and engaging said deformation, said lock ring having internal dimensions permitting it to pass over the end of said inner member lying within the outer member, a packing nut embracing said inner member and having threaded engagement with said outer member for drawing said nut toward said lock ring, and an annular ring of compressible sealing material snugly fitting between said members and compressed between said nut and said lock ring, said inner tubular member being free to slide relative to said outer tubular member in member-separating direction, whereby said lock ring will compress said sealing material.

2. In a pipe coupling, inner and outer telescoping tubular members, there being a recess in the outer wall of said inner member where it lies within the outer member, a split lock ring adapted to slide over the end of said inner member lying within the outer member, there being a lip on said lock ring adapted to enter said recess, a packing nut embracing said inner member and having threaded engagement with said outer member for drawing said nut toward said lock ring, and an annular ring of compressible sealing mateiral snugly fitting between said members and compressed between said nut and said lock ring, said inner tubular member being free to slide relative to said outer tubular member in member-separating direction, whereby said lock ring will compress said sealing material.

3. In a pipe coupling, inner and outer telescoping tubular members, there being a recess in the outer wall of said inner memer where it lies within the outer member, a split lock ring adapted to slide over the end of said inner member lying within the outer member, there being a lip on said lock ring adapted to enter said recess, a packing nut embracing said inner member and having threaded engagement with said outer member for drawing said nut toward said lock ring, and an annular ring of compressible sealing material snugly fitting between said members and compressed between said nut and said lock ring, said inner tubular member being free to slide relative to said outer tubular member in member-separating direction, whereby said lock ring will compress said sealing material, there being coacting parts between said outer member and said lock ring for urging said lip into said recess as said packing nut is tightened.

4. In a pipe coupling, inner and outer telescoping tubular members, there being a recess in the outer wall of said inner member in the end thereof which lies within the outer member, said outer member having an inside wall diverging radially outward and away from said end of said inner member the following parts being adapted to slip over said end of said inner member and to be assembled thereon in the order named, a packing nut, a wedge ring, an annular ring of compressible sealing material fitting snugly between said inner and outer members, and a lock ring, said packing nut having threaded engagement with said outer member for drawing the nut toward said end of said inner member, there being a part on said lock ring adapted to enter said recess, there being a surface on said lock ring complementary to said diverging wall of said outer member for urging said lock ring toward said inner member when said nut is tightened, and there being coacting surfaces on said wedge ring and packing nut for urging said wedge ring toward said inner member when said nut is tightened.

5. In a pipe coupling, inner and outer telescoping tubular members, there being a recess in the outer wall of said inner member where it lies within the outer member, a split lock ring adapted to slide over the end of said inner member lying within the outer member, the radially innermost part of said lock ring being adapted to enter said recess, a packing nut embracing said inner member and having means engaging said outer member for drawing said nut toward said lock ring, and an annular ring of compressible sealing material snugly fitting between said members and compressed between said nut and said lock ring, said inner tubular member being free to slide relative to said outer tubular member in member-separating direction, whereby said lock ring will compress said sealing material, there being coacting parts between said outer member and said lock ring for urging said lock ring into said recess as said packing nut is tightened.

GEORGE E. ARMINGTON.
RAYMOND Q. ARMINGTON.